US007421515B2

(12) United States Patent
Marovich

(10) Patent No.: US 7,421,515 B2
(45) Date of Patent: Sep. 2, 2008

(54) METHOD AND SYSTEM FOR COMMUNICATIONS NETWORK

(75) Inventor: Scott B. Marovich, East Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 688 days.

(21) Appl. No.: 10/051,397

(22) Filed: Jan. 17, 2002

(65) Prior Publication Data

US 2003/0135653 A1 Jul. 17, 2003

(51) Int. Cl.
*G06F 15/16* (2006.01)
(52) U.S. Cl. .................. 709/250; 709/203; 709/238; 709/246; 710/1; 710/3; 710/7; 710/20; 710/21
(58) Field of Classification Search .................. 709/205, 709/203, 250, 238–239, 246; 710/1, 3, 7, 710/20–21, 31–33, 38
See application file for complete search history.

(56) References Cited

U.S. PATENT DOCUMENTS

| | | | | | |
|---|---|---|---|---|---|
| 4,833,671 | A | * | 5/1989 | Beckner et al. ............. | 370/429 |
| 5,917,821 | A | * | 6/1999 | Gobuyan et al. ............ | 370/392 |
| 5,982,459 | A | * | 11/1999 | Fandrianto et al. ........ | 348/425.3 |
| 6,078,733 | A | * | 6/2000 | Osborne ..................... | 709/250 |
| 6,157,955 | A | | 12/2000 | Narad et al. ................ | 709/228 |
| 6,173,322 | B1 | * | 1/2001 | Hu .............................. | 709/224 |
| 6,223,211 | B1 | * | 4/2001 | Hamilton et al. ............ | 709/203 |
| 6,289,461 | B1 | * | 9/2001 | Dixon ......................... | 713/201 |
| 6,304,553 | B1 | * | 10/2001 | Gehman et al. ............. | 370/235 |
| 6,427,169 | B1 | * | 7/2002 | Elzur .......................... | 709/224 |
| 6,570,884 | B1 | * | 5/2003 | Connery et al. ............. | 370/419 |
| 6,651,099 | B1 | * | 11/2003 | Dietz et al. ................. | 709/224 |
| 6,665,725 | B1 | * | 12/2003 | Dietz et al. ................. | 709/230 |
| 6,678,746 | B1 | * | 1/2004 | Russell et al. ................. | 710/1 |
| 6,717,719 | B1 | * | 4/2004 | Moore ........................ | 359/340 |
| 6,789,116 | B1 | * | 9/2004 | Sarkissian et al. ........... | 709/224 |
| 6,804,240 | B1 | * | 10/2004 | Shirakawa et al. .......... | 370/392 |
| 6,954,789 | B2 | * | 10/2005 | Dietz et al. ................. | 709/224 |
| 7,095,715 | B2 | * | 8/2006 | Buckman et al. ............ | 370/230 |
| 2002/0118640 | A1 | * | 8/2002 | Oberman et al. ............ | 370/230 |

* cited by examiner

*Primary Examiner*—Saleh Najjar
*Assistant Examiner*—Shawki S Ismail

(57) ABSTRACT

A system and method of operation are provided for using a network interface to process incoming messages sent by a client device to a network server. The network interface includes a First-In-First-Out (FIFO) buffer for assembling the incoming messages from a serial to a parallel form and a regular-expression pattern matching circuit connected to the FIFO buffer. The regular-expression pattern matching circuit is adapted to, concurrent with the assembly of the incoming messages from a serial to a parallel form, perform HTTP message header recognition and parsing, and provide to the server parsed HTTP message headers in a compact form. The regular-expression pattern matching circuit generates client response messages automatically based on a content of the parsed HTTP message headers. The system performance and quality of service of the network server is improved.

4 Claims, 3 Drawing Sheets

METHOD AND SYSTEM FOR COMMUNICATIONS NETWORK

TECHNICAL FIELD

The present invention relates generally to network management and more particularly to a system and method of operation for improving the performance of servers that support networks.

BACKGROUND ART

In most computer data-communication networks, information is sent in bit- or byte-serial form. However, most computers, e.g., central processing unit (CPU) and memory systems, process data in byte- (or word-) parallel form. Thus, most network-interface devices ordinarily include a "shift register", e.g., a First-In-First-Out (FIFO) buffer, in order to assemble a sequence of arriving message bits into a block of bytes/words. Assembly of message bits typically also includes some form of transmission-error detection and/or correction system. The block of bytes/words is then transferred to a computer simultaneously, i.e., in parallel form. Many data-communication systems divide messages into limited-size "packets" for this and other purpose, where the block-size limit varies among systems.

Serial-to-parallel assembly of data entails a certain time delay before a network interface is ready to transfer each assembled part of a message between the communication medium and the computer.

The Internet is a world-wide collection of networks and gateways that use the Transmission Control Protocol/Internet Protocol (TCP/IP) suite of protocols to communicate with one another. At the heart of the Internet is a backbone of high speed data communication lines between major nodes or host computers consisting of thousands of commercial, government, educational, and other computer systems that route data and messages.

World Wide Web ("WWW" or "Web") refers to the total set of interlinked hypertext documents residing on hypertext transfer protocol (HTTP) servers all around the world. Documents on the WWW, called pages or Web pages, have historically been written in hypertext mark-up language (HTML) identified by uniform resource locators (URL) that specify the particular machine and pathname by which a file can be accessed and transmitted from node to node to the end user under HTTP. A Web site is a related group of these documents and associated files, scripts, subprocedures, and databases that are served up by an HTTP server on the WWW.

Users need a browser program and an Internet connection to access a Web site. The browser programs, also called "Web browsers," are client applications that enable a user to navigate the Internet and view HTML documents on the WWW, another network, or the user computer. Web browsers also allow users to follow codes called "tags" imbedded in an HTML document, which associate particular words and images in the document with URLs so that a user can access another file that may be half way around the world, at the press of a key or the click of a mouse.

These files may contain: text (in a variety of fonts and styles); graphic images; movie files; sounds as well as Java applets; Practical Extraction and Report Language (Perl) applications; other scripted languages; ActiveX-controls; or other small imbedded software programs that execute when the user activates them by, for example, clicking on a link. Scripts are applications that are executed by a HTTP server in response to a request by a user. These scripts are invoked by a HTTP "daemon" to do a single job, and then they exit.

One type of script is a common gateway interface (CGI) script. Generally, a CGI script is invoked when a user clicks on an element in a web page, such as a link or image. CGI scripts are used to provide interactivity in a Web page. CGI scripts can be written in many languages including C, C++, and Perl. A CGI-BIN is a library of CGI scripts applications that can be executed by a HTTP server.

Internet cookies or HTTP cookies consist of blocks of data that a web server returns to a user in response to a request from the user. The HTTP cookies are stored in "cookie" fields of the HTTP message protocol headers (message protocol headers or message headers). The block of data is then stored on the user's system (client). When the user returns to the same web site, the user sends a copy of the cookie back to the web server, thereby identifying the user to the web server. Cookies are used to identify users, to instruct the server to send a customized version of the requested web page, to submit account information for the user, and for other administrative purposes.

Message protocol headers are ordinarily analyzed after initial parts of an arriving message are transferred to a computer. The analysis of the message protocol headers causes further time delay in addition to the delay due to the serial-to-parallel data assembly. For example, in a conventional network, the server (host), specifically the operating system of the server, analyzes the message protocol headers by performing HTTP message header recognition and parsing to extract the HTTP message headers and the HTTP cookies. This HTTP message header recognition and parsing is a time-consuming process and thus limits the server's capacity to support the network when message arrival rates are high, resulting in low quality of service and an extended waiting period for users to receive services. As data transmission speeds increase, these delays contribute to limiting the overall performance of a computer-based communication and application system.

One solution in the prior art consists of using a monolithic integrated circuit, which includes a network interface and a microprocessor, to perform some of the analysis of the message headers ordinarily done by a server. The microprocessor can perform the analysis at a faster rate than the server. However, this prior art solution is still not adequate to cope with the ever-increasing message delivery and arrival rates.

There is a need therefore, for an enhanced arrangement which will improve system performance and quality of services of network servers so that information can be accessed by users at an increased speed.

DISCLOSURE OF THE INVENTION

The present invention provides an improved system and method of operation for using a network interface to process incoming messages sent by a client device to a network server. System performance and quality of services of the network server are improved.

The present invention provides a network interface that performs regular-expression pattern matching concurrently with serial-to-parallel message-component assembly, such that analysis of message protocol headers occurs while incoming message data is being clocked into a FIFO buffer. In this way, the message protocol header analysis incurs no extra time delay, and a compact representation of the extracted protocol header information is ready for transfer to a server at the same time as the ordinary, assembled parts of the message. Further, the network interface is adapted to generate client response messages based on the extracted protocol header information. Therefore, the client will receive a faster response and thus the quality of service will improve.

The present invention provides a network interface for processing incoming messages sent by a client device to a server. The network interface includes a First-In-First-Out (FIFO) buffer which is adapted to receive the incoming messages and to assemble the incoming messages from a serial to a parallel form, and a regular-expression pattern matching circuit connected to the FIFO buffer. The regular-expression pattern matching circuit is adapted to, concurrent with the assembly of the incoming messages from a serial to a parallel form, recognize Hypertext Transfer Protocol (HTTP) message headers embedded in the incoming messages, parse recognized HTTP message headers into parsed HTTP message headers, and provide the parsed HTTP message headers to the server.

The present invention further provides a server for providing services to a client device. The server includes a central processing unit (CPU); a bus connected to the CPU; a memory connected to the bus; and a network interface for processing incoming messages sent by the client device to the server. The memory includes a server application program stored therein. The network interface includes a First-In-First-Out (FIFO) buffer, which is adapted to receive the incoming messages and to assemble the incoming messages from a serial to a parallel form, and a regular-expression pattern matching circuit connected to the FIFO buffer. The regular-expression pattern matching circuit is adapted to, concurrent with the assembly of the incoming messages from a serial to a parallel form, recognize Hypertext Transfer Protocol (HTTP) message headers embedded in the incoming messages, parse recognized HTTP message headers into parsed HTTP message headers, and provide the parsed HTTP message headers to the CPU and the memory.

The present invention still further provides a communications network, which includes a client device; and a server connected to the client device for providing services to the client device. The server includes: a central processing unit (CPU); a bus connected to the CPU; a memory connected to the bus; and a network interface for processing incoming messages sent by the client device to the server. The memory has a server application program stored therein. The network interface includes a First-In-First-Out (FIFO) buffer which is adapted to receive the incoming messages and to assemble the incoming messages from a serial to a parallel form, and a regular-expression pattern matching circuit connected to the FIFO buffer. The regular-expression pattern matching circuit is adapted to, concurrent with the assembly of the incoming messages from a serial to a parallel form, recognize Hypertext Transfer Protocol (HTTP) message headers embedded in the incoming messages, parse recognized HTTP message headers into parsed HTTP message headers, and provide the parsed HTTP message headers to the CPU and the memory.

The present invention also provides a method for processing incoming messages sent by a client device to a server. The method includes: (a) receiving the incoming messages using a First-In-First-Out (FIFO) buffer; (b) assembling the incoming messages from a serial to a parallel form using the FIFO buffer; and concurrent with the assembling of the incoming messages from a serial to a parallel form: (c) recognizing Hypertext Transfer Protocol (HTTP) message headers embedded in the incoming messages received by the FIFO buffer using a regular-expression pattern matching circuit, (d) parsing recognized HTTP message headers into parsed HTTP message headers using the regular-expression pattern matching circuit, and (e) providing the parsed HTTP message headers to the server.

The above and additional advantages of the present invention will become apparent to those skilled in the art from a reading of the following detailed description when taken in conjunction with the accompanying drawings.

BEST MODE FOR CARRYING OUT THE INVENTION

Figure 1:
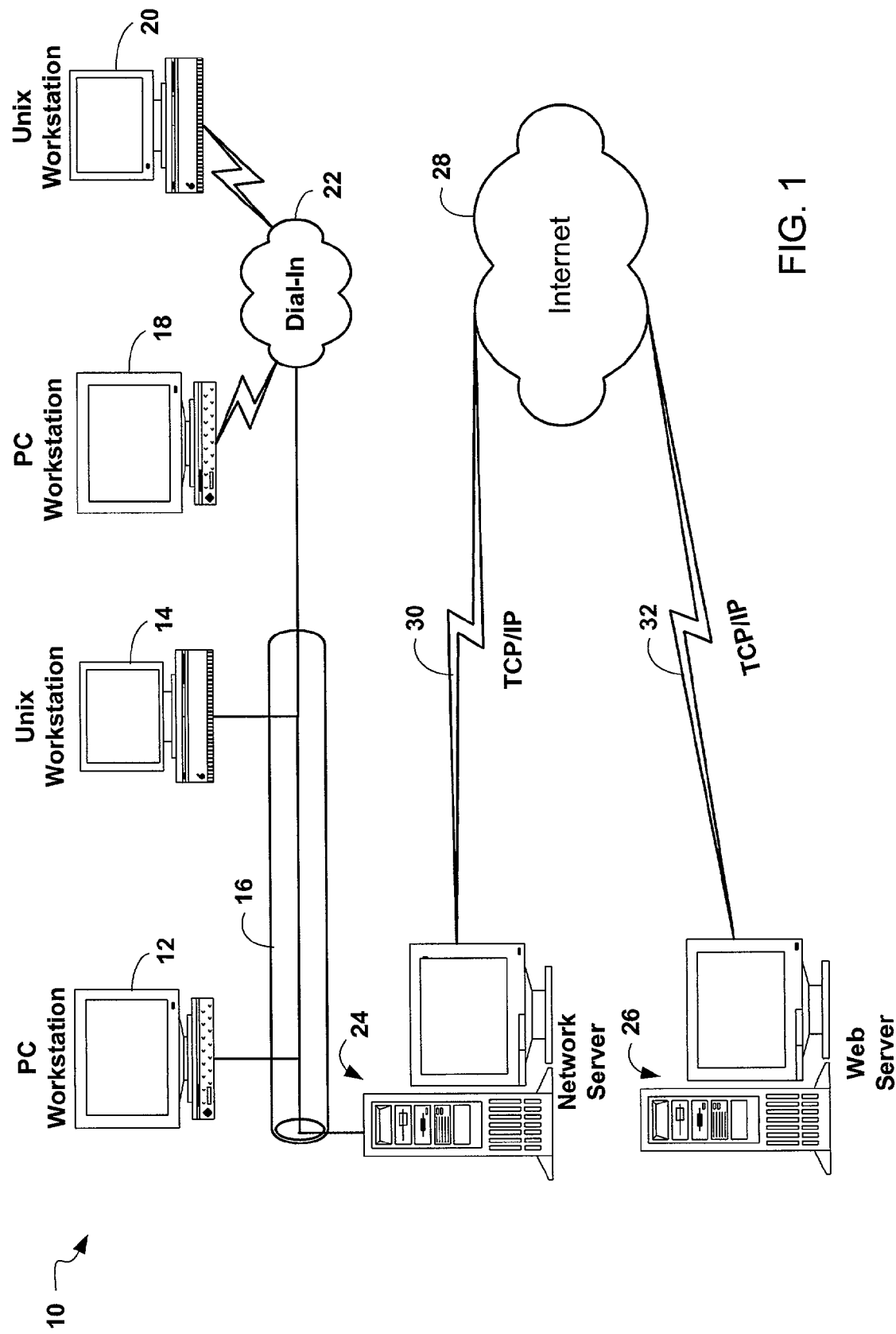
FIG. 1 is a block diagram of a communications network constructed in accordance with the present invention.

Referring now to FIG. 1, therein is shown a block diagram of a communications network 10 constructed in accordance with the present invention. While the system configuration could take many forms, FIG. 1 illustrates a plurality of diverse workstations, such as a personal computer workstation 12 and a Unix workstation 14 directly connected to a network 16. The network 16 may be, for example, a local area network (LAN) or an Ethernet type network. Additional workstations 18 and 20 may similarly be remotely located and in communication with the network 16 through a dial-in or other connection 22. Each of the workstations 12, 14, 18, and 20 in FIG. 1 is uniquely illustrated to emphasize that workstations may be of a plurality of diverse hardware platforms. Further, workstations 12, 14, 18, and 20 may be desktop or laptop systems.

The communications network 10 also includes a network server 24, which is connected to the network 16, and a web server 26. The network server 24 communicates with the web server 26 over the Internet 28 using lines 30 and 32. The communications over the lines 30 and 32 conform to TCP/IP standards. The lines 30 and 32 are generally copper lines, but they may also be optical fiber, wireless, or a combination thereof.

As is well known, browser applications are provided and readily available for a variety of hardware platforms. Browsers are most commonly recognized for their utility for accessing information over the Internet 28. A browser is a device or platform that allows a user to view a variety of service collections. The browser retrieves information from the web server 26 or the network server 24 using HTTP, then interprets HTML code, formats, and displays the interpreted result on a workstation display.

Additional workstations (not shown) may similarly be located and in communication with the web server 26 for access to web pages on the web server 26 and the Internet 28. These additional workstations may communicate with the web server 26 on a LAN network (not shown).

Figure 2:
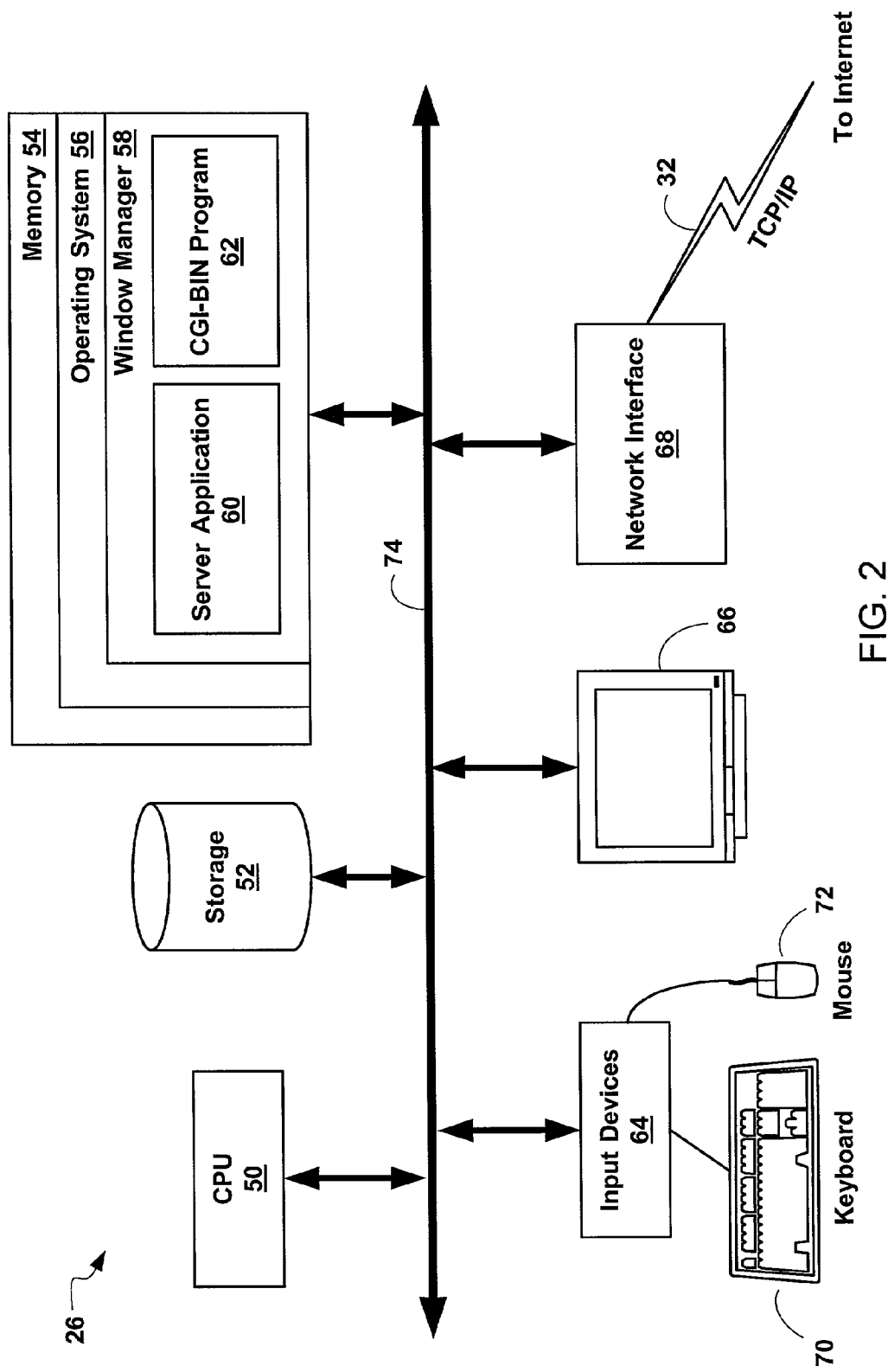
FIG. 2 is a block diagram of a web server constructed in accordance with the present invention.

Referring now to FIG. 2, therein is shown a block diagram of the web server 26 constructed in accordance with the present invention. The web server 26 provides services requested by client devices, such as the workstations 12, 14, 18, and 20. The web server 26 includes a central processing unit (CPU) 50, a storage device 52, and a memory 54 with a server operating system 56, and a window manager 58. The window manager 58 includes a server application program 60 and a Common Gateway Interface-binaries (CGI-BIN) program 62. The CGI-BIN program 62 is a file directory that holds external applications to be executed by an HTTP server, such as the web server 26, via CGI.

The web server 26 also includes input devices 64, a display terminal 66, and a network interface 68. The input devices 64 may include a keyboard 70 and a pointing device, such as a mouse 72. Instructions from an operator of the web server 26 can be signaled by using the input devices 64. The instruction input and result output are displayed on the display terminal 66.

The CPU 50, the storage device 52, the memory 54, the input devices 64, the display terminal 66, and the network interface 68 communicate with each other over a local bus 74.

The network interface 68 is connected to the Internet 28 using the line 32, which conforms to the TCP/IP standards.

Figure 3:
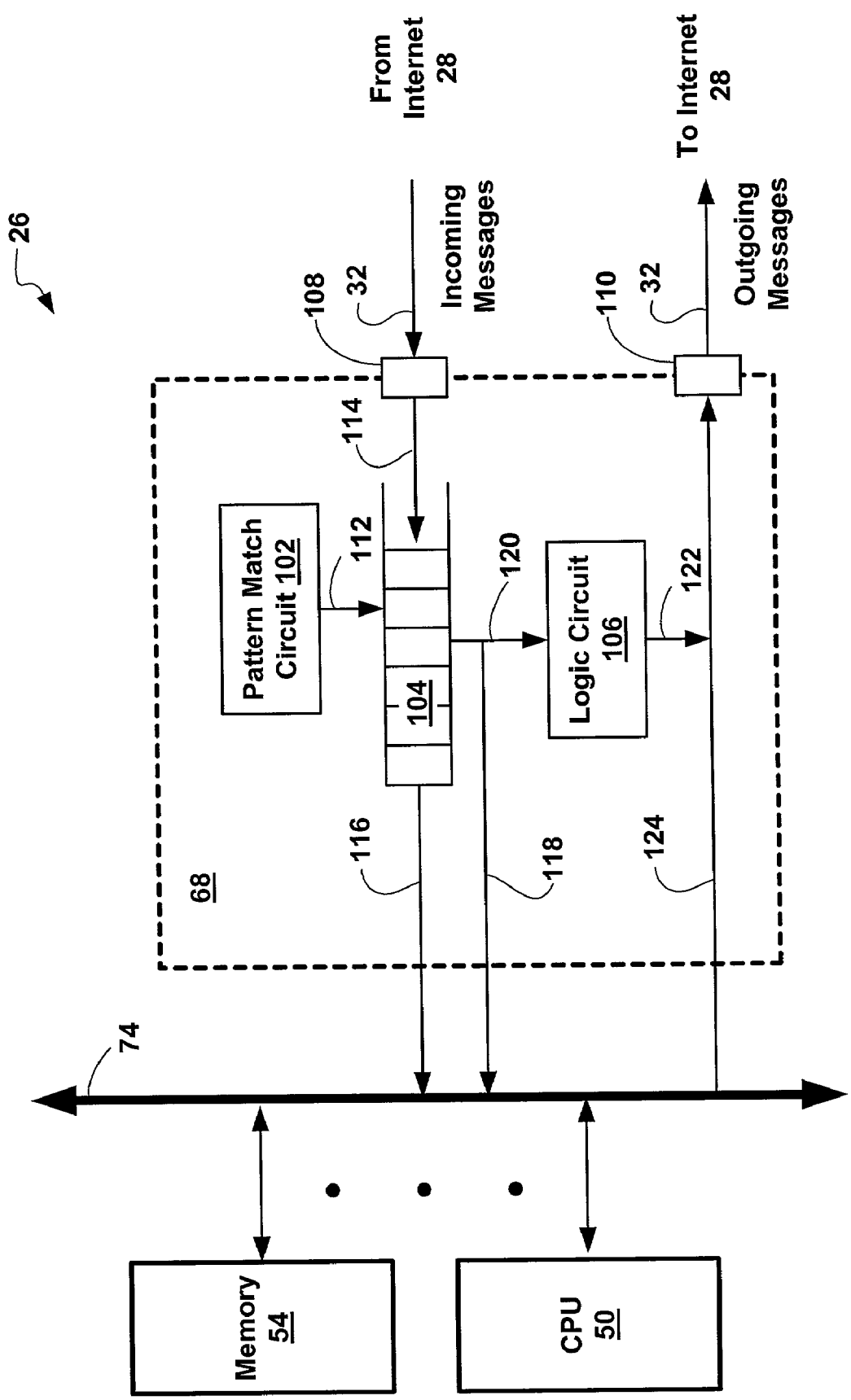
FIG. 3 is a block diagram of a portion of the web server of FIG. 2 constructed in accordance with the present invention.

Referring now to FIG. 3, therein is shown a block diagram of a portion of the web server 26 showing a schematic block diagram of the network interface 68. For simplicity of illustration, only the CPU 50, the memory 54, the network interface 68 and the local bus 74 are shown in FIG. 3.

The network interface 68 includes a Regular-Expression Pattern Matching Circuit (Pattern Matching Circuit) 102, a first-in-first-out (FIFO) buffer 104, a logic circuit 106, an input port 108 and an output port 110.

The Pattern Matching Circuit 102 is connected by a line 112 to the FIFO buffer 104. The FIFO buffer 104 is connected by a line 114 to the input port 108, which is connected to receive incoming messages (or signals) from the Internet 28 over the line 32. The FIFO buffer 104 is also connected by lines 116 and 118 to the local bus 74. The FIFO buffer 104 is further connected by a line 120 to the logic circuit 106. The function of the FIFO buffer 104 is to receive incoming messages from a client over the Internet 28 and the line 114.

The logic circuit 106 is connected by lines 122 and 124 to the output port 110, which is connected by the line 32 to provide signals or messages to a client over the Internet 28.

The function of the Pattern Matching Circuit 102 is to recognize and parse HTTP message headers, including HTTP cookies, in incoming messages that are provided to the FIFO buffer 104. One method by which this is done is to store in memory a sequence of data bytes having a pattern identical to a received data packet, where a byte-by-byte comparison is made between the stored data and the received packet data. The parsed (or extracted) HTTP message headers are then sent in a compact form to the CPU 50 and the memory 54 over the line 118 and the local bus 74. As used herein, a message in compact form means a message which has its category or priority encoded/represented using a small number of bits (e.g., a small integer). A message that is provided in a compact form helps a server to make decisions about it more rapidly than by repeatedly examining the entire (possibly long) message itself. In addition, a client response message can be generated by the logic circuit 106 based on the parsed HTTP message headers. The client response message is then sent over the lines 122 and 124 to the output port 110 for providing to the client over the Internet 28.

The present invention allows regular-expression pattern matching to be performed concurrently with the serial-to-parallel message-component assembly, such that message protocol header analysis can be done while incoming data is being clocked into the FIFO buffer 104. In this way, the message protocol header analysis incurs no extra time delay, and a compact representation of the extracted message protocol header information is ready for transfer to the web server 26 at the same time as the ordinary, assembled parts of the message. This technique may be referred to as "latency hiding"; i.e., overlapping some parts of a series of information processing steps in order to reduce the sequence's overall delay. The latency hiding technique has often been applied to the internal design of CPUs, but it is believed that it has not been previously applied to the present problem in the way described herein.

When HTTP messages are carried over a TCP/IP data-communication network, a network interface incorporating the present invention may also perform pattern-matching against TCP and IP protocol headers as well as HTTP protocol headers, since the combination of all of this information is what allows a server to distinguish among clients most precisely. While TCP/IP header processing in a network interface is well understood in the state of the art, the present invention increases system performance and quality of services by combining (and temporally "overlapping") pattern matching with message assembly in a "shift register" which resulted in reduced latency.

Further, while message protocol header processing in the lowest level of Ethernet (and similar "link level") may involve, in some implementations, recognizing an arriving packet's destination Ethernet "address" (also known as a "link level" address, or media access controller (MAC) address) when the packet is being shifted into a FIFO buffer, it is believed that it has not been previously applied to the present problem in the way described herein.

Another aspect of the present invention is that implementing the pattern matching is apt to require considerable circuitry that examines bits (or bytes) of the FIFO buffer "in parallel". This means that the present invention lends itself especially well to implementation as a monolithic integrated circuit, making it particularly compatible with existing network system architecture.

In operation, a client requests services from the web server 26 of the communications network 10 through a browser program stored in the workstation 12. The browser program is software that interacts with the web server to obtain the requested data and functionality requested by the client. The browser program may include, for example, Netscape, Internet Explorer, etc. These browser programs reside in the computer memory of the workstation 12 and access communication facilities modem (not shown) in the workstation 12 to transport the client's request to other resources connected to the communications network 10. In order to find a resource, the client should know the network location of the resource denoted by a network location identifier or URL. These identifiers are often cryptic, following very complex schemes and formats in their naming conventions.

The client's request is sent to the web server 26 in the form of HTTP messages. The HTTP messages include HTTP message files and HTTP message headers, including HTTP cookies. The incoming messages are sent over the Internet 28 and are received by the input port 108 of the network interface 68. The incoming messages are then provided to the FIFO buffer 104 over the line 114.

Next, the FIFO buffer 104 assembles the HTTP messages from a serial to a parallel form. Concurrent with the assembly of the HTTP messages from a serial to a parallel form, the Pattern Matching Circuit 102 performs recognition of HTTP message headers included in the HTTP messages that are provided to the FIFO buffer 104. HTTP message headers that are recognized are parsed from the HTTP messages. The parsed HTTP message headers are then provided in a compact form to the CPU 50 and the memory 54 over the line 118 and the local bus 74 for further processing.

It should be noted that it is highly desirable to parse arriving messages' headers quickly to enable a server to rapidly classify and prioritize the messages, perhaps even thereby discarding some which are judged to be of sufficiently low priority. This is done in order to satisfy either or both of the two following goals.

First, it provides service that is better for some designated clients or applications than for others, by prioritizing the order of service.

Second, it helps protect the server against overload by quickly identifying requests that should be given low-priority (or no) service.

In both cases, having a network interface rapidly perform at least some of the work needed to classify an arriving message reduces the amount of computation and time delay that a server must incur, which thereby increases its speed and capacity for service.

Therefore, messages which have their headers parsed are more rapidly categorized, and they may be more rapidly assigned higher or lower priorities, than messages whose headers are not so parsed.

Further, a client response message can be generated by the logic circuit 106 based on a content of the parsed HTTP message headers. The client response message may be a customized version of a requested web page based on information about previous visits by the user. The client response message is then sent over the lines 122 and 124 to the output port 110 for providing to the client over the Internet 28 without waiting for a response from the CPU 50 and the memory 54.

If the Pattern Matching Circuit 102 fails to recognize the HTTP message header of an incoming message, the incoming message is passed in unparsed form to the CPU 50 and the memory 54 over the line 116 and the local bus 74 for further processing using conventional techniques. After processing, a client response is provided by the CPU 50 and the memory 54 to the client user over the local bus 74, the line 32, the Internet 28, the line 30, and the network server 24.

Accordingly, by performing the HTTP message header recognition and parsing using the Pattern Matching Circuit 102 concurrently with the message-component assembly using the FIFO buffer 104, the overall system performance of the web server improves since the CPU 50 and the server operating system 56 can perform other tasks concurrently. Further, since the logic circuit 106 can be used to generate client response messages automatically without waiting for the CPU 50 and the memory 54 to respond, the client will receive a faster response and thus the quality of service will improve.

It should be understood that multiple FIFO buffers and Pattern Matching Circuits may be required recognize eligible incoming messages from different senders who have, for example, different Internet Protocol (IP) addresses. In addition, increasing the size (or length) of each FIFO buffer increases the percentage of eligible incoming messages that are likely to be recognized. Further, the Pattern Matching Circuit 102 may be implemented by hardware, software, or a combination thereof.

It should also be understood that the present invention may be used in other applications in addition to the Internet or the World Wide Web environment of the Internet. For example, the present invention can be used on any network, such as intranets or local area networks, in which messages such as HTTP messages are transmitted with embedded HTTP message headers. Also, the site interfacing software for interfacing with a server at a site of the network can be different from the browsers of the World Wide Web.

While the present invention is described herein in terms of so-called "server/client" computer systems, it should further be understood that the present invention is applicable to the "peer-to-peer" systems. In the "peer-to-peer" systems, servers can be clients and vice versa. Further, the present invention is applicable to either end of a data-communication link, although the end receiving the most message traffic would derive the greatest benefit.

While the network interface is described herein as part of the server, those skilled in the art will recognize that the network interface can be a unit external to the server.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters hither-to-fore set forth herein or shown in the accompanying drawings are to be interpreted in an illustrative and non-limiting sense.

The invention claimed is:

1. A network interface for processing an incoming message sent by a client device to a server, comprising:
    a First-In-First-Out (FIFO) buffer adapted to receive the incoming message and to assemble the incoming message from a serial to a parallel form;
    a regular-expression pattern matching circuit connected to the FIFO buffer, the regular-expression pattern matching circuit adapted to, concurrent with the assembly of the incoming message from a serial to a parallel form, recognize a Hypertext Transfer Protocol (HTTP) message header embedded in the incoming message, parse the recognized HTTP message header into a parsed HTTP message header, provide the parsed HTTP message header in a compact form to a CPU and memory in the server, and provide to the CPU and memory in the server the incoming message that cannot be recognized by the regular-expression pattern matching circuit, wherein:
        the HTTP message header includes a HTTP cookie, and
        the regular-expression pattern matching circuit is implemented by a technique selected from the group consisting of hardware, software, and a combination thereof; and
    a logic circuit connected to the FIFO buffer, the logic circuit adapted to provide a response message to the client device based on a content of the recognized HTTP message header.

2. A server for providing services to a client device, comprising:
    a central processing unit (CPU);
    a bus connected to the CPU;
    a memory connected to the bus, the memory having a server application program stored therein; and
    a network interface for processing an incoming message sent by the client device to the server, the network interface including:
        a First-In-First-Out (FIFO) buffer adapted to receive the incoming message and to assemble the incoming message from a serial to a parallel form.
        a regular-expression pattern matching circuit connected to the FIFO buffer, the regular-expression pattern matching circuit adapted to, concurrent with the assembly of the incoming message from a serial to a parallel form, recognize a Hypertext Transfer Protocol (HTTP) message header embedded in the incoming message, parse the recognized HTTP message header into a parsed HTTP message header, provide the parsed HTTP message header in a compact form to the CPU and the memory, and provide to the CPU and the memory any incoming message that cannot be recognized by the regular-expression pattern matching circuit, wherein:

the HTTP message header includes an HTTP cookie, and the regular-expression pattern matching circuit is implemented by a technique selected from the group consisting of hardware, software, and a combination thereof, and a logic circuit connected to the FIFO buffer, the logic circuit adapted to provide a response message to the client device based on content of the recognized HTTP message header.

3. A communications network comprising:

a client device; and a server connected to the client device for providing services to the client device, the server including:

a central processing unit (CPU), a bus connected to the CPU, a memory connected to the bus, the memory having a server application program stored therein, and a network interface for processing an incoming message by the client device to the server, the network interface including:

a First-In-First-Out (FIFO) buffer adapted to receive the incoming message and to assemble the incoming message from a serial to a parallel form, a regular-expression pattern matching circuit connected to the FIFO buffer, the regular-expression pattern matching circuit adapted to, concurrent with the assembly of the incoming message from a serial to a parallel form, recognize a Hypertext Transfer Protocol (HTTP) message header embedded in the incoming message, parse the recognized HTTP message header into a parsed HTTP message header, provide the parsed HTTP message headers header in a compact form to the CPU and the memory, and provide to the CPU and the memory any incoming message that cannot be recognized by the regular-expression pattern matching circuit, wherein:

the HTTP message header includes an HTTP cookie, and the regular-expression pattern matching circuit is implemented by a technique selected from the group consisting of hardware, software, and a combination thereof, and a logic circuit connected to the FIFO buffer, the logic circuit adapted to provide a response message to the client device based on a content of the recognized HTTP message header.

4. A method for processing an incoming message sent by a client device to a server, comprising:

receiving the incoming message using a First-In-First-Out (FIFO) buffer;

assembling the incoming message from a serial to a parallel form using the FIFO buffer; and concurrent with the assembling of the incoming message from a serial to a parallel form:

recognizing a Hypertext Transfer Protocol (HTTP) message header embedded in the incoming message received by the FIFO buffer using a regular-expression pattern matching circuit, parsing the recognized HTTP message header into a parsed HTTP message header using the regular-expression pattern matching circuit, wherein the HTTP message header includes a HTTP cookie:

providing the parsed HTTP message header in a compact form to a CPU and a memory in the server;

providing a response message to the client device based on a content of the recognized HTTP message header;

providing to the server any incoming message that cannot be recognized by the regular-expression pattern matching circuit.

* * * * *

UNITED STATES PATENT AND TRADEMARK OFFICE
CERTIFICATE OF CORRECTION

PATENT NO. : 7,421,515 B2
APPLICATION NO. : 10/051397
DATED : September 2, 2008
INVENTOR(S) : Scott B. Marovich It is certified that error appears in the above-identified patent and that said Letters Patent is hereby corrected as shown below:

In column 8, line 57, in Claim 2, delete "form." and insert -- form, --, therefor.

In column 9, line 37, in Claim 3, delete "headers" before "header in".

In column 10, line 29, in Claim 4, delete "cookie:" and insert -- cookie; --, therefor.

Signed and Sealed this

Thirteenth Day of January, 2009

JON W. DUDAS
*Director of the United States Patent and Trademark Office*